United States Patent [19]

Suzuki

[11] Patent Number: 4,750,394
[45] Date of Patent: Jun. 14, 1988

[54] CUTTING MACHINE FOR DECORATION CHAINS

[76] Inventor: Hideya Suzuki, 31-2 Minami-cho 2-chome, Warabi-shi, Saitama-ken, Japan

[21] Appl. No.: 30,567

[22] Filed: Mar. 27, 1987

[30] Foreign Application Priority Data

Mar. 28, 1986 [JP] Japan .............................. 61-45690[U]

[51] Int. Cl.⁴ ............................................... B26D 7/06
[52] U.S. Cl. ........................................ 83/420; 83/421; 83/439; 83/443; 83/449; 83/175
[58] Field of Search ................. 83/420, 421, 439, 443, 83/449, 349, 18, 175, 700

[56] References Cited

U.S. PATENT DOCUMENTS 4,257,295 3/1981 Patel ...................................... 83/420

FOREIGN PATENT DOCUMENTS 58-11470 11/1983 Japan .

Primary Examiner—Paul A. Bell
Assistant Examiner—Scott A. Smith
Attorney, Agent, or Firm—Holman & Stern

[57] ABSTRACT

A cutting machine for decoration chains for cutting a chain-like workpiece formed by coupling a number of ring-like units, the chains being wound on a guide wheel and being inserted in a spiral groove formed on the peripheral surface of the guide wheel, a cutting tool of the rotating cutting tool holder passes into the groove of the guide wheel for cutting engagement with the chain-like workpiece in the groove, and a longitudinally regulating mechanism for adjusting the width of the groove to correspond to the size of the chain.

7 Claims, 3 Drawing Sheets

CUTTING MACHINE FOR DECORATION CHAINS

BACKGROUND OF THE INVENTION

1. Field of the Invention

This invention relates to a cutting machine for decoration chains for cutting the surfaces of the chains which form a decoration such as a necklace or a bracelet by a diamond cutting tool or a carbide cutting tool.

2. Description of the Prior Art

A conventional cutting machine of this type has a groove on the peripheral surface of a stationary guide wheel, and cuts the outer surface of a chain by a cutting tool mounted outwardly on a disk-like holder while feeding the chain in the groove of the guide wheel. In such a conventional cutting machine, there arises a drawback that a wavy cutting scar is formed on the surface of the charm due to the difference between the rotating speed of the cutting tool and the product feeding speed, and it is difficult to finish the surface of the chain in a mirror-polished state.

The inventor has succeeded in eliminatings the abovementioned drawback by forming the groove of the stationary guide wheel in a spiral shape, mounting the cutting tool inwardly and forming a linear portion on a portion opposed to the cutting tool, as shown in, Japanese Utility Model Publication No. 58-11 470 (Application No. 54-173914-Registration No. 1516764, dated Nov. 28, 1983). However, the machine of that invention requires exchanging stationary guide wheels having different groove sizes for workpieces of different sizes. This invention obviates this drawback.

SUMMARY OF THE INVENTION

An object of this invention is to provide a cutting machine for decoration chains which can finish the chains in a mirror-polished state without a cutting scar.

Another object of this invention is to provide a cutting machine for decoration chains which can regulate the width of the spiral groove of a guide wheel in response to the size of the chains and can cut the chains to a higher quality than the conventional machine.

To achieve the above and other objects of the invention, there is provided according to the present invention a cutting machine for decoration chains comprising a cutting tool inwardly mounted on the outer end of a cutting tool holder attached to a rotational shaft, a guide wheel having a spiral groove formed on the peripheral surface thereof and a linear portion formed on the portion of the spiral groove opposed to the cutting tool, the guide wheel being elevationally adjustable relative to the cutting tool, and tension rollers and feed rollers mounted at the right and left sides of the guide wheel, wherein the guide wheel has one part axially movable and has front and rear surfaces thereon which form sides of the the spiral groove, an axially adjusting or regulating mechanism for the movable part for varying the width of the groove, and a spring mounted on the base for applying a tension to the tension rolls and thereby to the chain workpiece.

In the cutting machine for decoration chains of the invention, a member having the front surface for the spiral groove is, for example, provided on the guide wheel part which is axially movable by the regulating mechanism. Thus, the cutting machine has a structure for regulating the width of the groove in response to the size of chains M, i.e., the thickness of the width of the chains. Therefore, the chains can be accurately set in a cutting section by regulating the width of the groove of the guide wheel. Since tension is always applied to the chains by the spring, the tension rollers of the rolls for feeding the chains M to the cutting position prevent displacement and dancing of the chain workpiece during the cutting step.

Since the width of the spiral groove for passing the chains M can be thus regulated even if the size of the workpiece, i.e., the thickness of the chains M, is altered in the cutting machine of the invention, the cutting work can be executed merely by regulating the width of the groove of the guide wheel. Thus, it is not necessary to exchange the guide wheel with another having the width of the groove matched to the chains to be cut in the cutting machine of the invention as is required in the conventional cutting machine, and it is not necessary to prepare a number of large guide wheels having different sizes. Since one of the roller pairs for moving the chains is always applied with tension by the spring, the chains do not displace nor dance during the cutting step, thereby resulting in cutting the chains with a more accurate quality.

DESCRIPTION OF THE PREFERRED EMBODIMENTS

The invention will be described with respect to an embodiment of a cutting machine for decoration chains with respect to the accompanying drawings.

Figure 1:
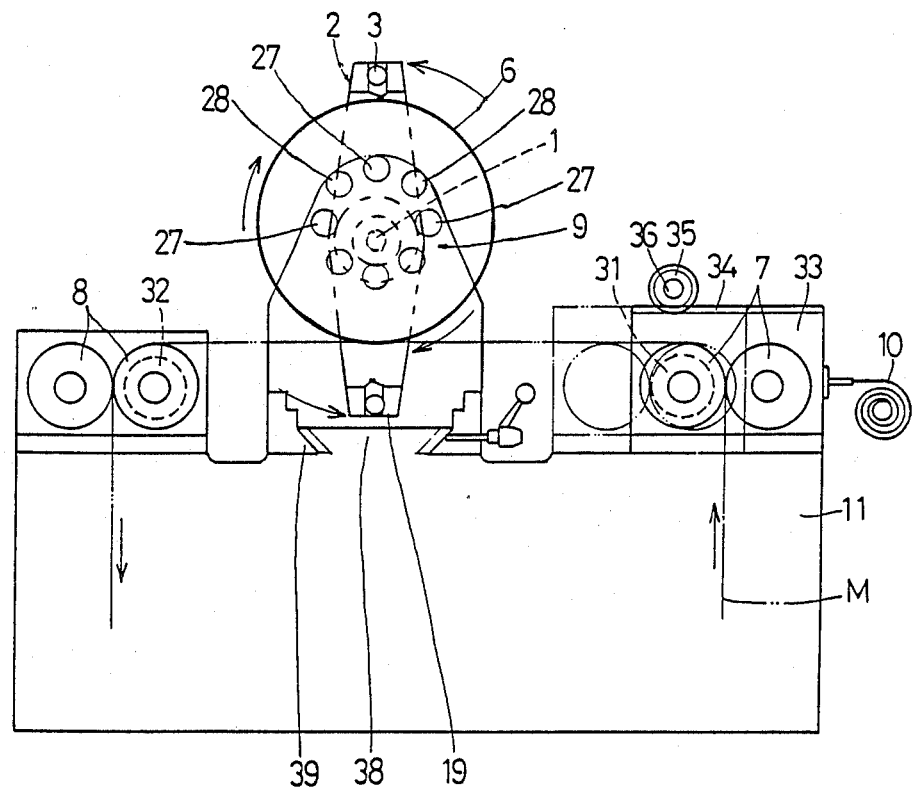
FIG. 1 is a schematic front elevatiional, partly fragmented view showing an embodiment of a cutting machine for decoration chains according to the present invention.
Figure 2:
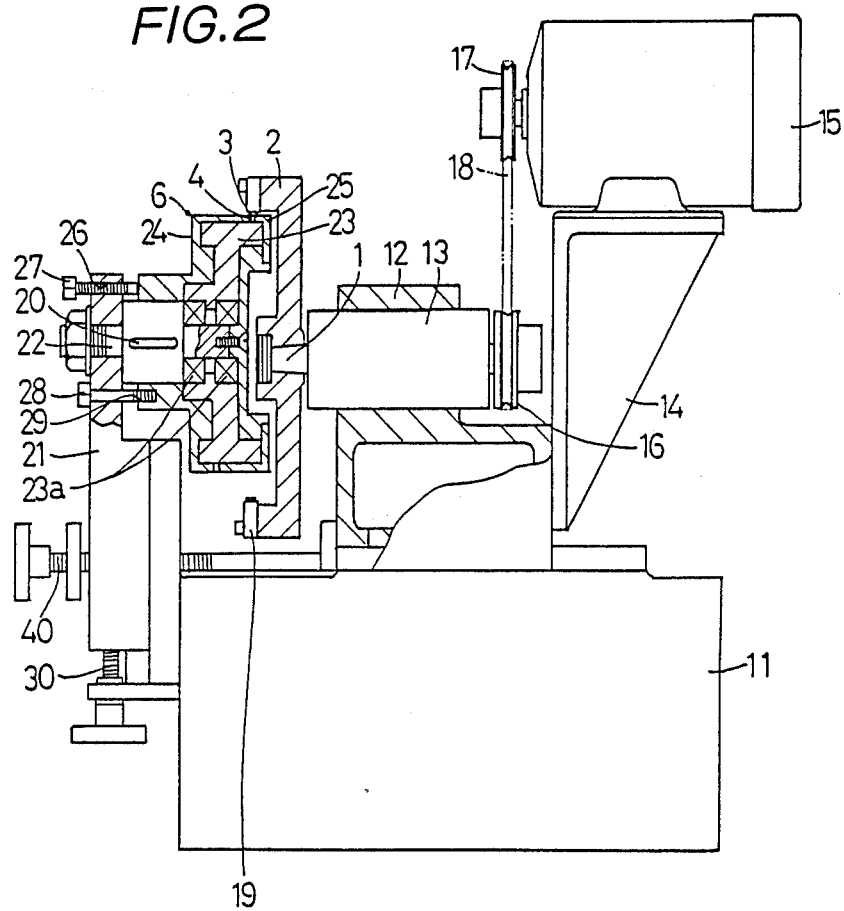
FIG. 2 is a partly cross-sectional side view of the cutting machine of FIG. 1.
Figure 3:
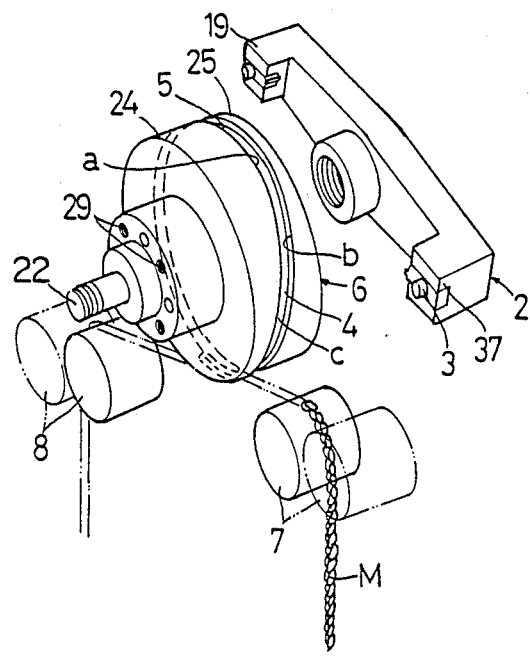
FIG. 3 is an exploded perspective view of the essential portion of the machine.
Figure 4:
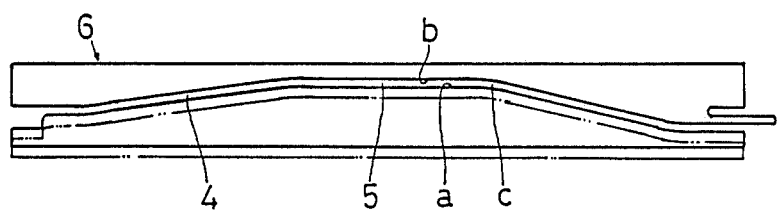
FIG. 4 is a developed plan view of the guide wheel of the invention.

A rotatable shaft 1 is provided in a spindle 13 supported by a bearing unit 12 provided on a machine base 11, and rotated by motor 15 through a belt 18 engaged between a pulley 16 rotatably attached to the shaft 1 and a pulley 17 attached to the shaft of motor 15 mounted on a frame 14 on the base 11 cutting tool holder 2 is mounted on shaft 1 for rotation therewith. The tool holder 2 has a rod or bar shape to be remarkably lighter than the conventional disk-like type, is reduced in size, durable at high speed rotation, and readily handled. A cutting tool 3 is mounted exchangeably on outer end of one side at the tool holder 2, which is formed at the other end as a counter balancer 19. A guide wheel 6 is pivotally secured to a shaft 22 which is attached through a key 20 to an elevational regulating member 21, and rotatably supported by a bearing 23a on an inner guide wheel 23 which forms the bottom c of the spiral groove 4 and is rotated by the chain M therein. The guide wheel 6 of this example has a regulating member 24 at the front side and a cover member 25 for covering the inner guide wheel 23 at the rear side in such a manner that the opposed surfaces of both the members 24 and 25 on the peripheral surface of the inner guide wheel 23 determines the width of the groove 4 having front surface a and rear surface b. A longitudinal regulating mechanism 9 has a plurality of regulating bolts 27, 28 attached near the periphery of the shaft 22 on which the guide wheel 6 is mounted, on elevational regulating member 21. One set of bolts 27 are engaged with the threaded openings 26 of the member 21 and contact at their ends with the end of the regulating member 24 for pushing against the latter in the direction away from member 21, and the other set of bolts 28 are engaged with the threaded openings 29 formed in the end of regulating member 24 to pull the member 24 outwardly toward member 21, the coacting operation of bolts 27, 28 thereby regulating the width of the groove 4. The regulating screw 30 rotatably mounted on base 11 and threadedly engages the lower end of regulating member 21 for raising and lowering member 21. The groove 4 in guide wheel 6 receives cutting tool 3 therein at the upper portion of the groove as shown in FIG. 2, and a linear portion 5 is provided in this upper portion of the spiral groove 4 (FIG. 4) where the groove receives the cutting tool.

Tension rolls 7, 7 and feed rolls 8, 8 are provided at the inlet and feeding sides of the guide wheel 6. The tension rolls 7, 7 are entirely tensioned by a spring 10 to apply a tension to chains M to be cut. One of the rolls of each roll pair 7, 7 and 8, 8 are driven by motors 31, 32. If the speed of the feed rolls 8 alters for a certain reason, the tension rolls 7 are supported by the spring 10. Thus, the tension rolls 7 can move to rotate a gear 35 engaged with a rack 34 provided in a unit case 33, thereby operating a variable voltage transformer ("such as known by the trade name Slidac") 36 for operating the feed rolls 8 to synchronize with rotating speeds of both the motors 31, 32. The machine also has a cutting tool support 37 provided in the tool holder 2, a dovetail rail 38 on the base 11 engaging dovetail groove 39 formed on the bearing unit 12, and a positioning screw 40 for adjusting the tool holder 2 along the cooperating groove and rail.

In the cutting machine for the decoration chains of the invention, constructed as described above, the member having the front surface a of the front, rear and bottom surfaces a, b and c of the spiral groove 4 is, for example, mounted on the guide wheel 6 to be longitudinally movable by the longitudinal regulating mechanism 9. Thus, the cutting machine has a structure for regulating the width of the groove in response to the size of chains M, i.e., the thickness of the width of the chains. Therefore, the chains can be accurately set in the cutting section by regulating the width of the groove 4 of the guide wheel. Since the tension is always applied to the chains M by the spring 10, the tension rolls 7, 7 of the rolls 7, 7 and 8, 8 for feeding the chains M to the cutting position are not displaced nor danced during the cutting step.

Since the width of the spiral groove 4 for passing the chains M can be thus regulated even if the size of the workpiece, i.e., the thickness of the chains M, is altered in the cutting machine of the invention, the cutting work can be executed merely by regulating the width of the groove of the guide wheels 6. Thus, it is not necessary to exchange the guide wheel having the width of the groove matched to the chains to be cut in the cutting machine of the invention as in the conventional cutting machine thereby omitting the exchanging step, and it is also not necessary to prepare a number of large guide wheels having different sizes of groove 4. Since one of the roll pairs 7, 7 and 8, 8 for moving the chains is always applied with tension by the spring 10, the chains do not displace nor dance during the cutting step, thereby cutting the chains in more accurate quality.

I claim:

1. In an apparatus for cutting decoration chains including a cutting tool mounted adjacent the radially outer portion of a tool holder attached to a shaft rotatably mounted on a base, means mounted on the base for driving the shaft, an outer guide wheel adjacent the cutting tool and having a spiral groove formed on the peripheral surface thereof with a linear portion formed in the portion of the spiral groove through which the cutting tool passes, a guide wheel support member adjustably mounted on the base for adjusting the guide wheel upwardly and downwardly, and chain workpiece tension rollers and feed rollers respectively mounted on the base on diametrically opposite sides of the guide wheel for tensioning and feeding a chain workpiece wound around the guide roller in the spiral groove thereof, the improvement comprising:

a guide wheel supporting shaft mounted on the guide wheel support member;

an inner guide wheel mounted on side guide wheel supporting shaft having an outer peripheral surface constituting the bottom surface of the spiral groove;

said outer guide wheel comprising an adjustable part axially slidably mounted on said inner guide wheel and a fixed part;

substantially radially extending opposing surfaces on said adjustable and fixed parts respectively forming respective sides of said spiral groove;

outer guide wheel regulating means comprising adjusting means adjustably mounted on said guide wheel support member and operatively engaging said adjustable part of said outer guide wheel for axially displacing said adjustable part relative to said fixed part and said inner guide wheel for varying the width of said spiral groove; and spring means mounted on the base and operatively connected to one of said tension rollers for resiliently urging said one tension roller in a direction for tensioning the chain workpiece.

2. The apparatus as claimed in claim 1 wherein said outer guide wheel regulating means comprises:

an end surface in said adjustable part of said outer guide wheel facing said guide wheel support member;

axially extending screw threaded bores in said end surface;

axially extending bores in said guide wheel support member aligned with said screw threaded bores;

first bolts freely rotatably mounted in said bores in said guide wheel support member, each bolt having a screw threaded portion engaged in said screw threaded bores in said adjustable part of said outer guide wheel;

axially extending screw threaded bores in said guide wheel support member; and second screw threaded bolts engaged in said screw threaded bores in said guide wheel support member and engaging at their ends with said end surface on said adjustable part of said outer guide wheel;

so that operation of said first bolts moves said adjustable part toward said guide wheel support member and away from said fixed part, and operation of said second bolts moves said adjustable part away from said guide wheel support member and toward said fixed part.

3. The apparatus as claimed in claim 1 wherein said spring means comprises a spiral coiled spring means for urging said one tension roller in a direction away from said feed rollers.

4. The apparatus as claimed in claim 2 wherein said spring means comprises a spiral coiled spring means for urging said one tension roller in a direction away from said feed rollers.

5. The apparatus as claimed in claim 1 wherein said tool holder comprises;
   a bar shaped member connected at the outer portion thereof to said tool holder shaft for rotation with said tool holder shaft.

6. The apparatus as claimed in claim 2 wherein said tool holder comprises;
   a bar shaped member connected at the outer portion thereof to said tool holder shaft for rotation with said tool holder shaft.

7. The apparatus as claimed in claim 4 wherein said tool holder comprises;
   a bar shaped member connected at the outer portion thereof to said tool holder shaft for rotation with said tool holder shaft.

* * * * *